L. J. HESSE.
Agricultural Building.
No. 203,452. Patented May 7, 1878.
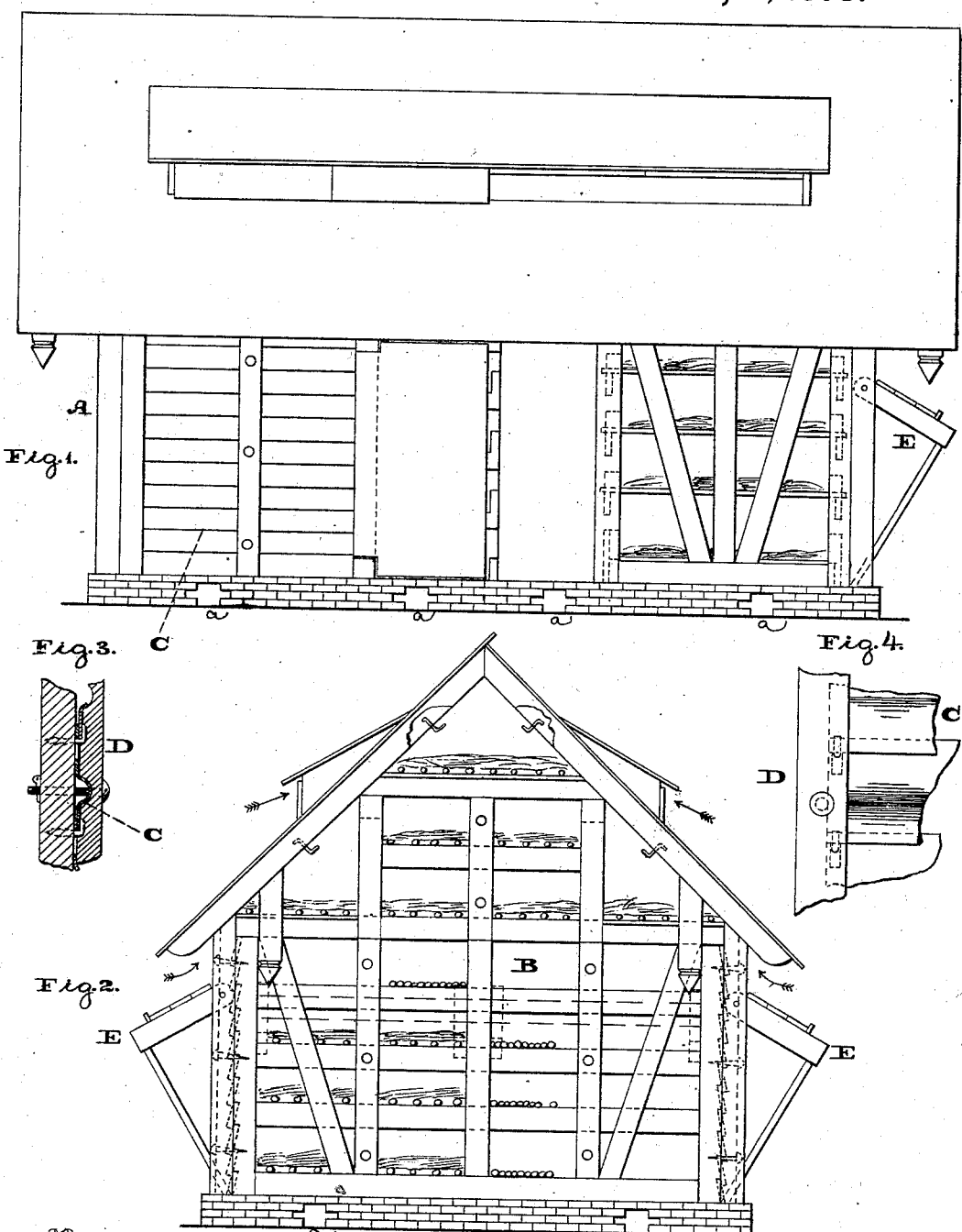

UNITED STATES PATENT OFFICE.

LUDWIG JULIUS HESSE, OF ST. PETERSBURG, RUSSIA.

IMPROVEMENT IN AGRICULTURAL BUILDINGS.

Specification forming part of Letters Patent No. 203,452, dated May 7, 1878; application filed March 21, 1878.

*To all whom it may concern:*

Be it known that I, LUDWIG JULIUS HESSE, of St. Petersburg, Russia, have invented a new and useful Improvement in Agricultural Buildings, which improvement is fully set forth in the following specification and accompanying drawings, in which—

Figure 1 is a side elevation of the agricultural building embodying my invention. Fig. 2 is an end view thereof. Figs. 3, 4, 5, and 6 are views of detached parts.

Similar letters of reference indicate corresponding parts in the several figures.

My invention relates to an agricultural building employed for drying and storing purposes; and it consists of a building provided with floor-ventilators and a fixed skeleton frame with a roof having trap-doors, in combination with removable side pieces or sheets, constituting the walls, and having securing-boards, said pieces being adapted to serve as temporary drying-floors.

It also consists of bars hinged to the skeleton frame, and adapted to hold the removable pieces of the walls as roofs.

Referring to the drawings, A represents an agricultural building of the order of a barn, and it is constructed of as many stories or tiers, stalls, apartments, &c., as desired. B represents the skeleton frame of the building, and C represents sheets of metal or pieces of wood, separated one from another and detachably connected to the frame B, and they constitute the walls of the building, and the manner of securing them to the frame may be varied—as, for example, the sheets of metal may be corrugated and overlap each other; and in order to secure them to the frame B, they are slotted and fitted on hooks connected to the frame. A covering-board or key, D, is fitted over the heads of the hooks and ends of the sheets, so as to inclose and protect the same, and it is properly secured to the adjacent pieces of the frame B; (see Figs. 3 and 4;) or I may serrate the uprights of the frame, apply the pieces thereto, and employ swivel heads or burrs to the covering-pieces, as in Figs. 5 and 6.

In Fig. 2 I show another manner of securing the walls to the uprights, by employing serrated covering-bars, and passing screws through the bars and uprights.

The operation is as follows: When grass is cut it may be immediately carried into the barn A; but, if desired, it may first remain a short while on the ground. The covering-plates D are displaced, and the sheets or pieces of the walls C removed and applied throughout the barn as temporary floors, on which the cut grass is placed.

The building is thus open or exposed, so that air and light have full access to the interior thereof, and the trap-doors of the roof are opened to admit the sun's rays and permit the escape of dampness, whereby the grass has every opportunity to dry. The grass will be properly turned and tossed until the hay is made; then the separated walls are taken up, the hay properly gathered or stored in the building, the walls fitted to the frames, the covering-pieces secured, and thus the walls of the barn are again in position, a closed and secure structure being presented.

During the drying or curing operation storms may arise. To prevent rain beating in the open sides of the building, I employ guards E, which consist of bars hinged to the frame B, and having applied to them some of the wall-pieces as roofs, which, when the bars are swung out, overhang, so as to prevent rain entering the building. The guards are supported on props, and when they are not required the props and wall-pieces are removed and the guards folded close to the building.

Suitable ventilators will be provided under the eaves of the roof, in the floor or foundation, as at *a a*, and elsewhere; and the upper portions of the building may have doors or windows, which will be held closed by suitable hooks or latches.

Grain and other products may be stored in the building and dried therein, according to requirements.

While it is believed that by the slower process of making hay in the building the hay is of better quality, I avoid all danger of loss of grass or hay outdoors due to sudden storms or pressure of other work; and there will be a saving of time and help, as the work need not be completed within a short specified time, as is necessary for hay-making as now practiced.

I am aware that it is not new to construct agricultural buildings with trap-doors, and portable buildings with removable clapboarding and skeleton frames, said boarding being secured by keys, bars, boards, &c.

I am also aware that ventilators have been applied to buildings in various ways; but in my invention the removable side pieces or sheets of the walls or clapboarding are short, and adapted to be employed as temporary drying-floors; the ventilators are made in the masonry of the foundation, and open directly into the building; and the skeleton frame is a fixture. Hence I believe that I have made an improvement in the construction of agricultural drying-buildings and storage-barns; and I therefore claim as my invention—

1. The agricultural drying-building and barn, the same consisting of the floor with ventilators $a\ a$, fixed skeleton frame B, with a roof having trap-doors, and the removable side pieces or sheets C with securing-boards D, said pieces C being adapted to serve as temporary drying-floors, all as set forth.

2. The agricultural building A constructed of the skeleton frame B, provided with hinged bars E with supporting pieces or props, and adapted to hold the removable pieces C as roofs, substantially as and for the purpose set forth.

The above specification signed by me.

LUDWIG JULIUS HESSE,
*Prussian subject.*

In presence of—
HEINRICH EDUARD HESSE,
*Land-owner.*
ERNST MENTZ,
*Master shoe-maker.*